United States Patent [19]

Thibodeau et al.

[11] 4,332,779

[45] Jun. 1, 1982

[54] PHOSPHORIC ACID FILTRATION PROCESS

[75] Inventors: Michael J. Thibodeau, Lakeland, Fla.; James S. Balcerski, Maplewood, N.J.

[73] Assignee: American Cyanamid Company, Stamford, Conn.

[21] Appl. No.: 209,805

[22] Filed: Nov. 24, 1980

[51] Int. Cl.$^3$ .............................................. C01B 25/16
[52] U.S. Cl. ................................ 423/321 R; 423/320; 210/778
[58] Field of Search ........................... 423/321 R, 320; 210/778

[56] References Cited

U.S. PATENT DOCUMENTS

| | | | |
|---|---|---|---|
| 3,928,551 | 12/1975 | Booth | 423/320 |
| 3,972,981 | 8/1976 | Harper et al. | 423/320 |
| 4,049,774 | 9/1977 | Harper et al. | 423/320 |

FOREIGN PATENT DOCUMENTS 47-15457  9/1972  Japan .............................. 423/321 R Primary Examiner—O. R. Vertiz
Assistant Examiner—Gregory A. Heller
Attorney, Agent, or Firm—Paul W. Leuzzi, II; Michael J. Kelly

[57] ABSTRACT

An improved process for the filtration of phosphoric acid wherein the prefilt phosphoric acid produced from the "wet process" is conditioned with a flocculant and a dispersant and thereafter filtered to concentrate the acid.

9 Claims, No Drawings

PHOSPHORIC ACID FILTRATION PROCESS

BACKGROUND

The oldest and still most economical method for making crude phosphoric acid is to treat phosphate rock with a mineral acid, i.e. sulfuric, phosphoric or nitric, thereby precipitating calcium salts and releasing phosphoric acid. Phosphoric acid so produced is used, in turn, both in treating phosphate rock for production of triple superphosphate and in reaction with ammonia to make ammonium phosphates. The growing importance of these products in the fertilizer industry makes phosphoric acid a very important intermediate. To a lesser extent, phosphoric acid can be used directly in some fertilizer applications and as a reagent in certain industrial processes.

Phosphoric acid produced by treatment of the phosphate rock with sulfuric acid is commonly known as "wet-process" or "green" acid. Production of phosphoric acid by the wet process generally involves dissolving the phosphate rock in sulfuric acid, holding the acidulate slurry until the calcium sulfate crystals grow to sufficient size, separating the acid and calcium sulfate by filtration and concentrating the acid to the desired level.

The separtation of the phosphoric acid from the calcium sulfate by filtration represents one of the main possibilities for further refinement of the wet process. Prefilt wet process acid is very impure in that it contains a wide variety of materials. These materials include organic material, silica and compounds of iron, aluminum, calcium and fluorine. Filtration of this acid slurry is an extremely difficult operation which requires foremost among other factors crystals of sufficient size, shape and strength for filtration to be effective. Very fine crystals have been found to result in filter blinding and crystals of insufficient strength will break apart under the filtration forces. Continuous production of satisfactory crystals has been dependent upon the proper sulfate concentration, slurry recirculation, phosphoric acid concentration and impurities in the processed rock. Although refinements in the filtration process have been the object of considerable development work, there yet exists the need for further improvements in this difficult operation.

SUMMARY OF THE INVENTION

The instant invention provides a process for filtering wet-process phosphoric acid which comprises adding to the wet-process phosphoric acid, in sequence, an effective amount of a cationic flocculant and a dispersant; conditioning the wet-procss phosphoric acid; filtering the wet-process phosphoric acid through a suitable medium; and thereafter recovering the filtered phosphoric acid. The recovered phosphoric acid filtrate is substantially free of organics and suspended solids. Filtration rates of the instant process are enhanced over those previously known in the art.

DETAILED DESCRIPTION OF THE INVENTION

In accordance with the instant invention there is provided a process for filtering wet-process phosphoric acid. The prefilt phosphoric acid feed is the result of dissolving ground phosphate rock in sulfuric acid and holding the acidulate slurry until the calcium sulfate crystals grow to sufficient size to withstand the filtration forces. The reaction believed to be followed is generally represented as:

$$Ca_3(PO_4)_2 + 3H_2SO_4 + 6H_2O \rightarrow 2H_3PO_4 + 3(CaSO_4 \cdot 2H_2O)$$

The highly acidic solution is then conditioned with a cationic flocculant and a dispersant prior to the filtration stage. Although the flocculant and dispersant are preferably added in sequence, with the flocculant being the initial additive, suitable results may be obtained when the flocculant and dispersant are added substantially simultaneously. The effective amount of the flocculant and dispersant to be added generally totals within the range of 0.001 pounds per ton of phosphate rock added to 2.0 pounds per ton of phosphate rock added. The ratio of flocculant to dispersant being added can range anywhere from 0.1:1.0 to 10.0:1.0 respectively, preferably betwen 1.0:1.0 to 2.0:1.0 respectively.

Suitable cationic flocculants useful in the instant invention include, but are not limited to, copolymers wherein one component is ethylenically unsaturated, such as acrylamide, and the other comonomer is either an amine or a quaternary, such as poly(ethylene amine), poly(2-hydroxypropyl-1-N-methylammonium chloride), poly(2-hydroxypropyl-1,1-N-dimethylammonium chloride), poly[N-(dimethylaminomethyl)acrylamide], poly(2-vinylimidazolium bisulfate), poly(diallyldimethylammonium chloride), poly(N,N-dimethylaminoethyl methacrylate), poly[N-(dimethylaminopropyl)methacrylamide], methacrylamidopropyltriammonium chloride, and the like.

Suitable dispersants useful in the instant invention include, but are not limited to, condensed phosphates, polyacrylates, organic phosphonates, methylenephosphonates, polysulfonates, sulfonated polycondensates, tannins, lignins, glucosides, gluconates, alginates, phosphoesters and phosphoglasses to name but a few. The polyacrylates are the preferred dispersants.

Subsequent to addition of the flocculant and dispersant, the prefilt is allowed to condition and then filtered through an appropriate filter medium. In operation, three or four filter stages are generally employed. The filter medium conventionally employed is a monofilament plastic filter cloth made from materials such as polyethylene, polypropylene, polyester and the like. The type of filter can vary greatly: plate-and-frame presses were most common in early recovery plants, with rotary drum vacuum filters and horizontal vacuum filters replacing them in latter day operations. Horizontal vacuum filters appear to be the currently preferred filter, with the belt filter, horizontal rotary table filter, in-line pan filter and horizontal rotary tilting-pan filter the major types. The solids content of the filtered acid is in the range of about 28 to 35 percent $P_2O_5$. With about 28 to 30 percent $P_2O_5$ solids the preferred operating variable.

The resultant acid is effectively separated from its impurities via this process and can be further concentrated for subsequent end uses. These uses may include treatment of phosphate rock for triple superphosphate production, manufacture of ammonium phosphate and as a fertilizer intermediate.

Whereas the exact scope of the instant invention is set forth in the appended claims, the following specific examples illustrate certain aspects of the present invention and more particularly point out methods of evaluating the same. However, the examples are set forth for illustration only and are not to be construed as limitations on the present invention except as set forth in the appended claims. All parts and percentages are by weight unless otherwise specified.

GENERAL PROCEDURE

A 700 ml. sample of phosphoric acid from the wet-process having a solids feed of 66% and a $P_2O_5$ content on the order of 28% is first filtered then the filter cake is washed with 230 ml. of water then filtered again, then washed again with 230 ml. of water and finally filtered for a last time. The filtrate is then analyzed for specific gravity, percentage solids and total organic carbon in parts per million.

COMPARATIVE EXAMPLE A

Following the General Procedure set forth above, a sample is processed and analyzed without addition of a flocculant or dispersant. Test results are set forth in Table I.

COMPARATIVE EXAMPLES B AND C

The General Procedure set forth above is followed in every material detail except the sample is initially conditioned with 10.5 ppm of a cationic flocculant in emulsion form prior to filtration. The flocculant is a copolymer comprising 10 percent methacrylamidopropyltrimethylammonium chloride and 90 percent acrylamide. Test results are set forth in Table I.

COMPARATIVE EXAMPLE D

The General Procedure set forth above is followed in every material detail except the sample is initially conditioned with 10.5 ppm of a cationic flocculant in emulsion form prior to filtration. The flocculant is a copolymer comprising 5 percent dimethylamino ethylmethylacrylate quaternary and 95 percent acrylamide. Test results are set forth in Table I.

COMPARATIVE EXAMPLE E

The General Procedure set forth above is followed in every material detail except the sample is initially conditioned with 10.5 ppm of a dispersant prior to filtration. The dispersant is a copolymer comprising 80 percent acrylic acid and 20 percent acrylamide with a molecular weight in the range of 1000 to 2000. Test results are set forth in Table I.

COMPARATIVE EXAMPLE F

The procedure of Comparative Example E is followed in every material detail except the dispersant employed now has a molecular weight in the range of 7000 to 10,000. Test results are set forth in Table I.

EXAMPLE 1

The General Procedure set forth above is followed in every material detail except that the sample is initially conditioned with 10.5 ppm of a flocculant/dispersant mixture wherein there is employed two parts of flocculant per part of dispersant and wherein the flocculant employed is a copolymer emulsion containing 10 percent methacrylamidopropyltriammonium chloride and 90 percent acrylamide and the dispersant employed is copolymer containing 80 percent acrylic acid and 20 percent acrylamide having a molecular weight on the order of 1000 to 2000. Test results are set forth in Table I below.

TABLE I

| | Phosphoric Acid Filtration | | | | | |
|---|---|---|---|---|---|---|
| | Filter Time (sec.) | | | Filtrate Properties | | |
| Example | Acid | 1st Wash | 2nd Wash | Spec. Grav. | % Solids | TOC* |
| A | 16.8 | 25.8 | 15.4 | 1.342 | 0.91 | 1571 |
| B | 17.7 | 29.5 | 16.7 | 1.336 | 0.42 | 1380 |
| C | 16.0 | 28.3 | 16.7 | 1.334 | 0.49 | 1421 |
| D | 16.3 | 27.7 | 16.1 | 1.333 | 0.39 | 1368 |
| E | 11.2 | 24.1 | 16.1 | 1.336 | 0.46 | 1648 |
| F | 9.9 | 21.9 | 14.6 | 1.334 | 0.24 | 1600 |
| 1 | 11.8 | 25.9 | 16.1 | 1.333 | 0.52 | 1268 |

*TOTAL ORGANIC CARBON (ppm)

We claim:

1. A process for the filtration of phosphoric acid produced by the wet-process comprising initially adding to the prefilt phosphoric acid an effective amount of a cationic flocculant and a dispersant said dispersant being selected from the group consisting of polyacrylates, polysulfonates polyphosphates, and sulfonated polycondensates wherein the ratio of the flocculant to dispersant is from about 0.1:1.0 to 10.0:1.0, respectively, conditioning the prefilt phosphoric acid and thereafter filtering the phosphoric acid to remove impurities and concentrate the acid.

2. The process of claim 1 wherein the cationic flocculant employed is a copolymer containing an ethylenically unsaturated monomer and either an amine or quaternary comonomer.

3. The process of claim 2 wherein the cationic flocculant is a copolymer of methacrylamidopropyltriammonium chloride and acrylamide.

4. The process of claim 2 wherein the cationic flocculant is a copolymer of dimethylaminoethylmethylacrylate quaternary and acrylamide.

5. A process for the filtration of phosphoric acid produced by the wet process comprising initially adding to the prefilt phosphoric acid an effective amount of a cationic flocculant and a polyacrylate dispersant wherein the ratio of the flocculant to the polyacrylate dispersant is from about 0.1:1.0 to 10.0:1.0, respectively, conditioning the prefilt phosphoric acid and thereafter filtering the phosphoric acid to remove impurities and concentrate the acid.

6. A process for the filtration of phosphoric produced by the wet process comprising initially adding to the prefilt phosphoric acid about 5 to 20 parts of a cationic flocculant and a dispersant said dispersant being selected from the group consisting of polyacrylates, polysulfonates polyphosphates, and sulfonated polycondensates per million parts of phosphoric acid wherein the ratio of the flocculant to the dispersant is from about 0.1:1.0 to 10.0:1.0, respectively, conditioning the prefilt phosphoric acid and thereafter filtering the phosphoric acid to remove impurities and concentrate the acid.

7. The process of claim 5 wherein the flocculant is a copolymer of acrylamide and dimethylamino ethylmethylacrylate quaternary.

8. The process of claim 5 wherein the flocculant is a copolymer of acrylamide and dimethylamino ethylmethylacrylate quaternary.

9. The process of claim 1 wherein the ratio of flocculant to dispersant being added is from about 1.0:1.0 to 2.0:1.0, respectively.

* * * * *